May 25, 1965  T. J. REESE  3,185,499
LOAD TRANSFER HITCH FOR VEHICLES
Filed April 16, 1963  2 Sheets-Sheet 1
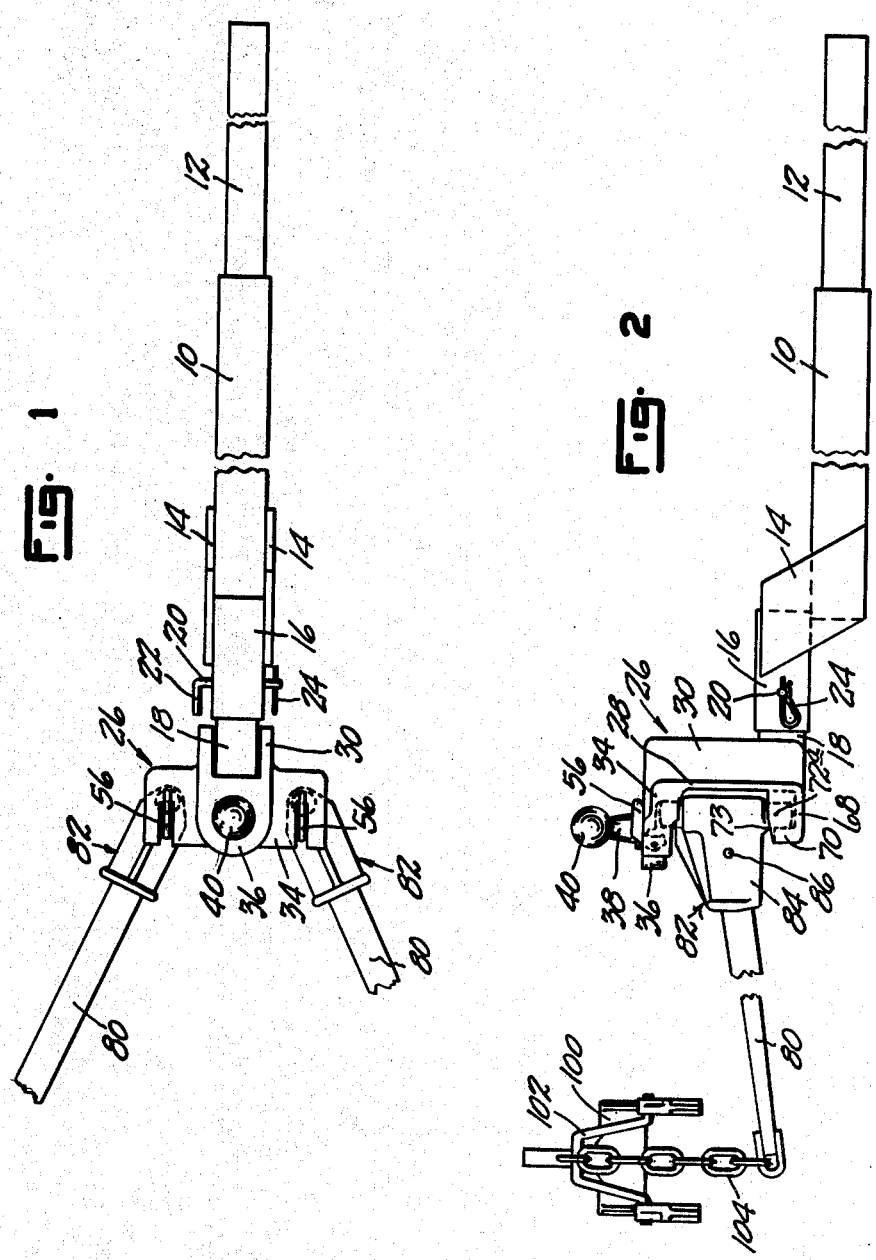
INVENTOR.
TERRELL J. REESE
BY
ATTORNEY

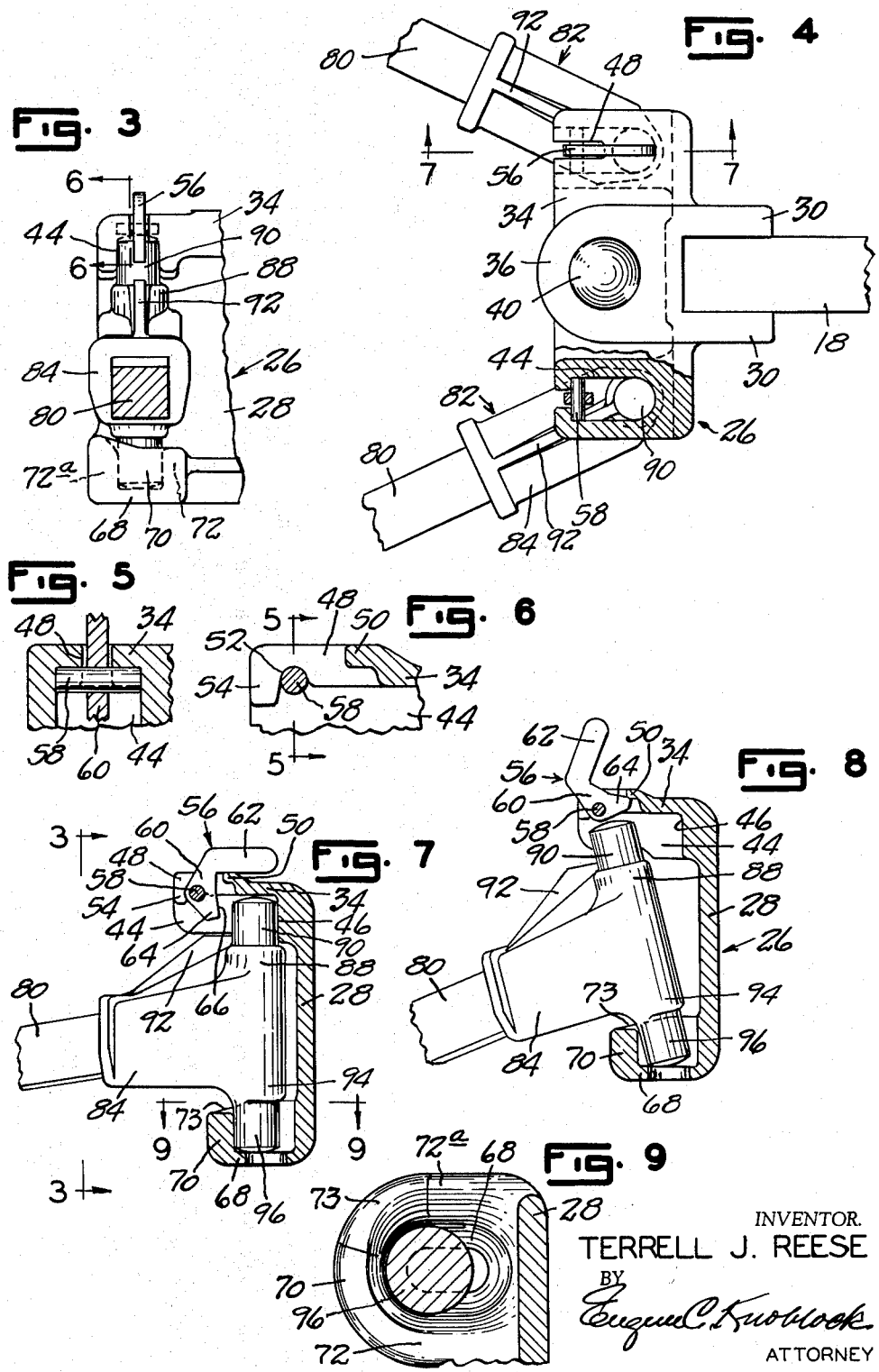

United States Patent Office 3,185,499
Patented May 25, 1965

3,185,499
LOAD TRANSFER HITCH FOR VEHICLES
Terrell J. Reese, 4013 Cassopolis St., Elkhart, Ind.
Filed Apr. 16, 1963, Ser. No. 273,478
7 Claims. (Cl. 280—406)

This invention relates to improvements in trailer hitches, and more particularly to a hitch for connecting a tractor to a trailer and serving to transmit part of a load from the trailer to the front wheels of the tractor so as to distribute the weight transmitted by the trailer to both the front and rear wheels of the tractor. This invention is an improvement upon the hitch covered by my prior Patent No. 2,952,475, dated September 13, 1960, and possesses substantially the same advantages.

The primary object of this invention is to provide a novel, simple and inexpensive hitch with means for detachably connecting spring steel bars to associated parts in a manner to accommodate ready installation and removal and to permit pivoting as required during operation of a tractor-trailer combination, wherein novel means are provided for positively insuring against the accidental or unintentional disconnection of such bars from their associated parts during use.

A further object is to provide a device of this character with a novel latch for interlocking spring bars having trunnion pins with socketed members, said locking means being releasable to accept installation of trunnion pins but requiring manual manipulation to accommodate disconnection of the parts and release of the trunnion pins.

A further object is to provide a device of this character wherein trunnion pins are carried by a spring bar mounting member and are receivable in socket members of a carrier in such relation that a spring bar must be installed in a predetermined relation to the socket member.

Other objects will be apparent from the following specification.

In the drawings:

FIG. 1 is a fragmentary top plan view of my new device;

FIG. 2 is a fragmentary side view of my new device;

FIG. 3 is a fragmentary vertical transverse sectional detail view taken on line 3—3 of FIG. 7;

FIG. 4 is a fragmentary detail top plan view with parts shown in section;

FIG. 5 is a fragmentary detail sectional view taken on line 5—5 of FIG. 6;

FIG. 6 is a fragmentary longitudinal sectional view taken on line 6—6 of FIG. 3;

FIG. 7 is a fragmentary longitudinal vertical sectional view taken on line 7—7 of FIG. 4;

FIG. 8 is a view similar to FIG. 7 but illustrating the trunnion pin in released position intermediate fully assembled position and disconnected position; and FIG. 9 is an enlarged fragmentary horizontal detail sectional view taken on line 9—9 of FIG. 7.

Referring to the drawings which illustrate the preferred embodiment of the invention, the numeral 10 designates an elongated rigid tubular member which is preferably of square or other non-circular cross-sectional shape. The member 10 telescopically mounts or receives a tube or bar 12 of suitable length and strength. The members 10 and 12 constitute parts of a carrier which are adapted to be secured at longitudinally spaced points to the frame or chassis of a tractive motor vehicle, such as an automobile or truck, in fixed relation thereto and in such a manner as to transmit stress acting upon the free or outer end of the carrier to the tractor frame at longitudinally spaced points thereof. If desired the parts 10 and 12 may be secured in selected adjustment although said parts may have a simple snug telescopic fit one within the other and each may be fixed by connection thereof to the tractor by suitable securing means (not shown) at selected points thereof. In the form shown the carrier tube 10 mounts a pair of laterally spaced vertical longitudinal substantially parallel plates or brackets 14. A rigid tube 16 is fixedly secured to and between the plates 14 in vertically offset and preferably substantially parallel relation to the tube 10, said tube 16 projecting rearwardly beyond the end of the tube 10 and preferably being of square or other non-circular cross-section.

A rigid elongated bar 18, which has a snug telescopic fit in the tube 16, is provided with one or more transverse apertures adapted to register with apertures in the opposed walls of the tube 16 to receive a pin or other securing member 20. Pin 20 is preferably of L-shape so as to provide a laterally projecting handle 22 at one end thereof and is preferably apertured at its opposite end to receive a resilient retainer member 24. A hitch ball bracket 26 is welded or otherwise fixedly secured to the outer or free end of the bar 18 and preferably projects vertically therefrom. The hitch ball bracket 26 is preferably an integral metal casting and includes a vertical transverse plate portion 28 reinforced by vertical forwardly projecting spaced symmetrically positioned flanges 30. The spacing of the inner faces of the flanges 30 is preferably substantially equal to the width of the bar 18 so that said flanges provide parts to which the bar 18 may be welded or otherwise fixedly secured. The bracket 26 includes an integral top wall portion 34 extending rearwardly from the plate 28 and having a central portion 36 adapted to support and securely mount the shank portion 38 of a kingpin 40 of the trailer hitch at an aperture in said central plate portion 36. The center or axis of the aperture and of the kingpin will preferably intersect the axis of the bar 18 and of the tubes 10 and 16. Each of the opposite side portions of the top wall 34 are provided at the bottom faces thereof with elongated longitudinally extending slots 44 open at the rear edge of the wall 34 and terminating at an abutment shoulder 46 preferably spaced rearwardly from the front wall 28. The top wall 34 is provided with a narrow slot 48 extending longitudinally therefrom and open at its rear end and having a reduced thickness offset or shoulder at 50 adjacent its inner end. The slot 48 extends through a thickened wall portion which is interrupted by an inverted notch 52, as best seen in FIG. 6, and the slotted wall portion is thickened or of greater depth at 54 adjacent the rear free or open end of the slot 48, as also seen in FIG. 6.

A trigger or latch member 56 is pivoted upon a pin 58 which is mounted in the recess part 52 and whose ends are welded to the thickened wall parts 34, 54 at the recess 52 so as to hold the same firmly in place. The trigger or locking member is of generally L-shape, being characterized by a normally vertical part 60 at which the pin 58 is journaled intermediate its length. An angularly extending handle 62 projects forwardly from the upuper end of the part 60. The nose or tongue 64 of the trigger or latch depends to a level below the pin 58 in its operative position so as to form a barrier in the upper slot 44. The inner face 66 of the nose 64 preferably extends at an angle slightly less than 90 degrees to the horizontal when the handle 62 bears upon the top surface of the top wall part 50, as seen in FIG. 7. The surface 66 of the nose 64 engages the bottom surface of the part 50 in its released position as illustrated in FIG. 8, for purposes to be described.

The hitch ball bracket has a pair of integral socket members projecting rearwardly from the wall 28 and outwardly from each wall 32 in vertically spaced relation below the top wall portion 34. Each socket portion has a bottom wall 68, a rear upwardly projecting wall 70 and spaced inner and outer upwardly projecting side walls 72 and 72a. The side walls 72a are located outermost and each has a beveled or inclined surface portion 73 projecting upwardly from the end wall 70 so that the height of the wall part 72a adjacent the plate portion 28 is greater than the height of the wall part 72, as best seen in FIG. 3.

An elongated spring unit of cantilevered type is detachably pivotally carried by the hitch ball bracket 26 at each side thereof. This cantilevered spring unit includes an elongated spring steel bar 80 which is normally straight and may be of any desired configuration, such as a longitudinally tapered shape as illustrated in FIG. 2. Each spring bar 80 is carried by a rigid pivot carrier 82. Each pivot carrier 82 includes a socket portion 84, is preferably elongated and tubular and has a bore of a cross-section similar to and of a size to snugly and non-rotatably receive an end portion of the spring bar 80. The length of the end portion of the spring bar which fits within the socket 84 is preferably substantially greater than the diameter or cross-sectional dimension of the spring bar. The front end portion of each spring bar 80 fitting within the socket 84 has a transverse aperture which is adapted to register with apertures in the socket 84 to receive a pin or other anchoring member 86 which preferably is detachably or removably mounted in said aperture and which may be of any suitable construction. An upwardly projecting part 88 is formed integrally with the spring carrier 84 and in turn carries a cylindrical upper pin portion 90. Rib or reinforcing means extend between the body 84 and the part 88 and the pin 90 and include a longitudinal reinforcing rib 92 extending longitudinally centrally upwardly from socket 84 and tapered for the major part of its length with the portion thereof adjacent the pin 90 extending to a level above the top of the part 88 but terminating substantially below the tip of the upper pin 90.

A downwardly projecting enlargement of the forward part of the socket 84 at 94 carries a downwardly projecting pin 96 of cylindrical character axially aligned with the pin portion 90. The pin portions 90 and 96 preferably terminate in rounded or part-spherical end surfaces. The length of the lower pin portion 96 from its tip to the socket portion 94 is preferably greater than the height of the socket wall 72 and substantially equal to the height of the socket wall 72a. The parts 88 and 94 of the socket are preferably larger in diameter than the pin portions 90, 94 respectively which project therefrom, and the bottom of the socket 84 is preferably free of any longitudinal reinforcing rib of the character of the rib 92, so that the bottom surface of the major part of the socket body 84 is positioned substantially above the level of the part 72a in the assembled relation of the parts as illustrated in FIG. 7. The common axis of the pin portions 90 and 96 preferably extends at an angle to the axis of the socket portion 84, as best seen in FIG. 7. The pin 90 is of a diameter substantially equal to the spacing between the side walls of the recess 44, as best seen in FIG. 3. The diameter of the pin 96 is preferably substantially equal to the spacing of the side walls 72 and 72a of the device but substantially less than the longitudinal dimension of that socket, so that the part 96 is free to pivot within the bottom receiving socket therefor, as illustrated in FIGS. 8 and 9. Consequently, the pins 90 and 96 constitute hinge pins which permit rotation of a cantilever spring unit when properly assembled with the bracket 26 as illustrated in FIGS. 1, 2, 3, 4 and 7. The pins 90 and 96 can be installed without requiring the use of any tools and by the simple manual manipulation to apply them in place. This can be done by holding the spring and its socket 82 in a rearwardly downwardly inclined position, as illustrated in FIG. 8, which permits the pin 96 to be inserted in the receiving socket defined by the parts 68, 70 and 72, while the upper pin 90 is clear of the upper part of the bracket 26. Thereupon the cantilever spring 80 can be swung upwardly at its free end about the pin 96 as a fulcrum, whereupon the upper pin 90 is caused to enter the slot 44 and to engage the tongue 64 of the latch members or locking lever to swing that locking lever counterclockwise, as viewed in FIG. 8, to a position which permits the pin 90 to pass the locking lever and to enter the rear portion of the slot 44 and engage the rear shoulder 46 of the slot. The locking lever is so balanced that it will return by gravity to the FIG. 7 position when the pin 90 has cleared it.

Removal of the spring lever from the carrier 26 is positively prevented by the locking lever 56. Thus, as viewed in FIG. 7, any movement of the pin 90 in the slot 44 toward the rear open end thereof is limited by engagement of the pin 90 with the surface 66 of the tongue 64 of the locking lever. Such engagement causes a tendency of the locking lever to swing clockwise as viewed in FIG. 7, whereupon the parts 62 thereof bears firmly against the top part 50 of the casting of the bracket 26 and positively locks or prevents withdrawal of the pin 90 through the slot 44. Thus positive assurance is had that under all conditions and positions and relations of the parts, the locking lever will be effective to hold the hitch parts assembled and in operative relationship unless and until manually tripped or manipulated. This assurance is had through the arrangement of the parts and does not require the use of springs in conjunction with the latch lever. Intentional release of the parts for removal of the spring bars upon disconnection of a trailer from a tractor, or for any other purpose, is accommodated easily and merely requires the lifting of the handle portion 62 of the locking lever to a position as illustrated in FIG. 8, whereupon the pin 90 can move out of the slot 44 without difficulty.

It will be observed that in operative position the pin 90 abuts the shoulder 46 at the front end of the slot 44, and the pin 96 abuts against the rear or outer wall 70 of the receiving socket therefor.

The opposite or free end of each spring bar 80 carries means for connecting it with a part of the frame of a trailer in such a manner as to stress or flex the spring bar 80. Thus most trailers are provided with forwardly projecting A-frames (not shown) to which may be secured a suitable bracket 100. A member 102 may be pivoted to the bracket and provided with means (not shown) by which its pivoted relation to the bracket 100 may be controlled. Part 102 may have connection by an elongated flexible member 104, such as a chain, with the free end of the spring bar 80. It will be understood that the part 102 may have two positions, in one of which it exerts an upward pull upon the free end of the spring bar 80 through the member 104 to maintain stress on the spring 80 and in another of which it is lowered so as to lower the pulling member 104 and the free end of the spring bar 80.

The relative proportions and dimensions of the parts are important with respect to the proper relation of the parts when assembled. Thus the relation of the vertical dimensions between the bottom surface of the top wall 34 of the carrier which defines the bottom edge or lips of the slot 44 and the top surface of the bottom socket wall 68 receiving the pin 96 is important with relation to the spacing between the bottom surface of the top wall 34 at the opposite sides of the slot 44 and the top surface of the shallow socket-defining wall 72. These two dimensions must be properly correlated to the vertical dimension between the bottom surface of the spring-receiving socket 84 and the tip of the upwardly projecting pin 90. Proper correlation of these dimensions substantially as illustrated will insure that the spring bar socket 82 cannot be installed in reversed relation at most angles of installation; in other words, will insure that upper pin 90 cannot be installed properly in the lower socket of a carrier intended to receive the lower pin 96. In the proportion shown it might be possible at positions in which the bar was within ten to fifteen degrees from parallelism with the auto bumper to insert the spring bar side in reverse arrangement where proper proportioning of the dimensions exists, but when the bars would be swung to a normal position, the then lower socket rib 92 would engage the inclined top surface 73 of the lower pin-receiving socket of the carrier and would bind the parts so that the user would be aware of the improper assembly. In this connection, the distance between the upper edge of the side wall 72a and the longitudinal bottom wall of the slot 44 at 34 would be too short to accept the pin 96 if it were positioned uppermost. Thus the user will be required to reassemble the parts and do it properly, and cannot by the use of force assemble the parts improperly.

The seating of the trigger mounting pin 58 in notches 52 in the carrier 26 and the welding of the pin in those notches is important in conjunction with the vertical dimension of the part 54 adjacent the socket 52. By this arrangement any force tending to release the pin 58 acts not only against the trigger lever 56 and the pivot pin 58, but also against the parts of the casting adjacent the notch, namely, the part 54, so as to firmly hold the trigger against release. Another important consideration of the trigger is the angular relation of the surface 66 thereof which insures that substantially uniform contact or linear contact will occur between the upper pin 90 and the trigger finger 64 if the side member 80 is tilted in releasing position while the lower pin 96 is adjacent the rear wall of its receiving socket.

While the preferred embodiment of the invention has been illustrated and described, it will be understood that changes may be made within the scope of the appended claims without departing from the spirit of the invention.

I claim:

1. In a trailer hitch of the type having a rigid hitchball bracket having a pair of sockets and a pair of longitudinally grooved parts provided with shoulders and each spaced vertically from one of said sockets,
   a pair of cantilever spring bars each having a pair of vertically aligned pivot pins seating in substantially vertically aligned pocket and grooved parts, and
   means for suspending the free end of each spring bar in flexed condition with one pin bearing against said shoulder, the improvement comprising
   a pivoted latch carried by each of said longitudinally grooved parts and normally positioned spaced from said pin and shoulder to retain a spring pivot pin therein,
   said latch being pivotal toward said shoulder to accommodate movement of said pin therepast in said grooved part to and from operative pivot position, and a handle on said latch engaging said bracket to prevent pivoting of said latch from normal position away from said shoulder.

2. In a trailer hitch of the type having a rigid hitchball bracket having a pair of sockets and a pair of longitudinally grooved parts provided with shoulders and each spaced vertically from one of said sockets,
   a pair of cantilever spring bars each having a pair of vertically aligned pivot pins seating in substantially vertically aligned socket and grooved parts, and
   means for suspending the free end of each spring bar in flexed condition to urge one pivot pin against said shoulder, the improvement comprising
   a latch pivoted by each longitudinally grooved part with a portion thereof positioned in said part spaced from said shoulder and the pin therein to swing lengthwise thereof toward said pin and shoulder, and
   a part projecting externally of said bracket and engageable therewith adjacent the groove thereof to limit pivoting of said latch to movement toward said shoulder from operative pivot pin retaining position.

3. In a trailer hitch of the type having a rigid hitchball bracket having a pair of sockets and a pair of longitudinally grooved parts each spaced vertically from one of said sockets,
   a pair of cantilever spring bars each having a pair of vertically aligned pivot pins seating in substantially vertically aligned socket and grooved parts, and
   means for suspending the free end of each spring bar in flexed condition, the improvement comprising
   a longitudinal slot in each grooved part and an L-shaped latch pivoted in said slot and having one part thereof projecting into said grooved part, and
   an angularly extending hand grip part positioned externally of said bracket and engageable with said bracket longitudinally of said slot.

4. In a trailer hitch of the type having a rigid hitchball bracket having a pair of sockets and a pair of longitudinally grooved parts each spaced vertically from one of said sockets,
   a pair of cantilever spring bars each having a pair of vertically aligned pivot pins seating in substantially vertically aligned socket and grooved parts, and
   means for suspending the free end of each spring bar in flexed condition, the improvement comprising
   a longitudinal slot in each grooved part and an L-shaped latch pivoted in said slot and having one part thereof projecting into said grooved part, and
   an angularly extending hand grip part positioned externally of said bracket and engageable with said bracket longitudinally of said slot,
   said grooved part being positioned above said socket with the groove lowermost,
   said latch means gravitationally pivoting to operative latching position with said hand grip part bearing on said bracket.

5. In a trailer hitch of the type having a rigid hitchball bracket having a pair of sockets and a pair of longitudinally grooved parts each spaced vertically from one of said sockets,
   a pair of cantilever spring bars each having a pair of vertically aligned pivot pins seating in substantially vertically aligned socket and grooved parts, and
   means for suspending the free end of each spring bar in flexed condition, the improvement comprising
   a longitudinal slot in each grooved part,
   a pivot pin welded to said bracket transversely of said slot, and
   a latch member pivoted in said slot on said pin and gravitationally positioned at one limit of pivotal movement with a part thereof projecting into said grooved part adjacent the open of said grooved part.

6. In a trailer hitch of the type having a rigid hitchball bracket having a pair of sockets and a pair of longitudinally grooved parts each spaced vertically from one of said sockets,
   a pair of cantilever spring bars each having a pair of vertically aligned pivot pins seating in substantially vertically aligned socket and grooved parts, and
   means for suspending the free end of each spring bar in flexed condition,
   wherein said bracket sockets are substantially cup-shaped and include a wall portion of progressively varying depth,
   said spring arm adjacent the pivot pin fitting in said socket being spaced from the end of said pin a distance greater than the greatest depth of said socket, and
   means carried by said spring arm adjacent the pivot pin fitting in said grooved part spaced from the end of said last named pin a distance less than the greatest depth of said socket.

7. In a trailer hitch of the type having a rigid hitchball bracket having a pair of sockets and a pair of longitudinally grooved parts each spaced vertically from one of said sockets,
   a pair of cantilever spring bars each having a pair of vertically aligned pivot pins seating in substantially vertically aligned socket and grooved parts, and means for suspending the free end of each spring bar in flexed condition, wherein said bracket sockets are substantially cup-shaped and include a wall portion of progressively varying depth, one pivot pin of each bar projecting therefrom a distance greater than the greatest depth of said socket, and the other pivot pin projecting therefrom a distance less than the greatest depth of said socket.

References Cited by the Examiner

UNITED STATES PATENTS

| | | |
|---|---|---|
| 731,707 | 6/03 | Putnam. |
| 1,655,174 | 1/28 | White. |
| 2,952,475 | 9/60 | Reese _____ 280—406 |

A. HARRY LEVY, *Primary Examiner.*

LEO FRIAGLIA, *Examiner.*